E. M. ROSENBLUTH.
VEHICLE NUMBER PLATE SUPPORT.
APPLICATION FILED JUNE 25, 1913.
1,181,960.
Patented May 2, 1916.
2 SHEETS—SHEET 1.
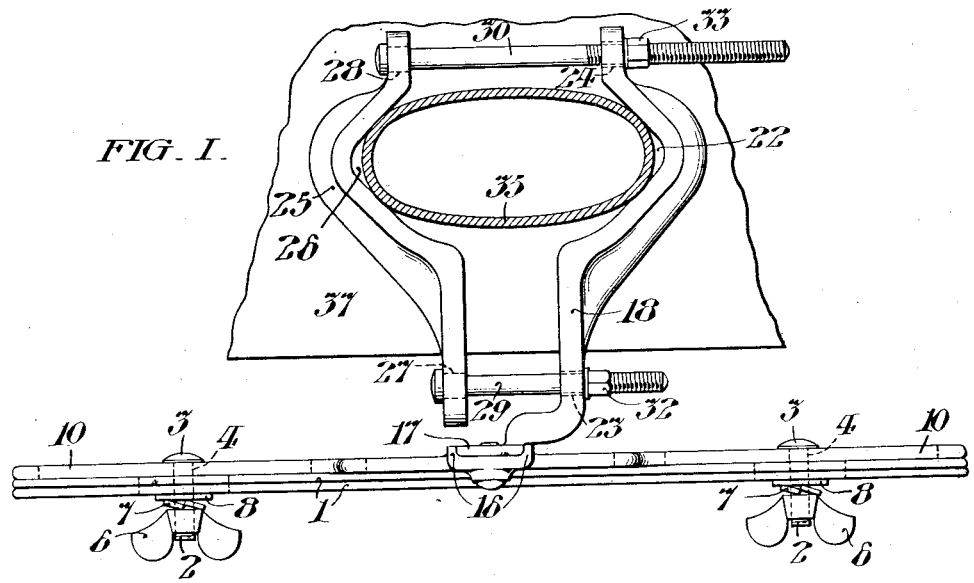
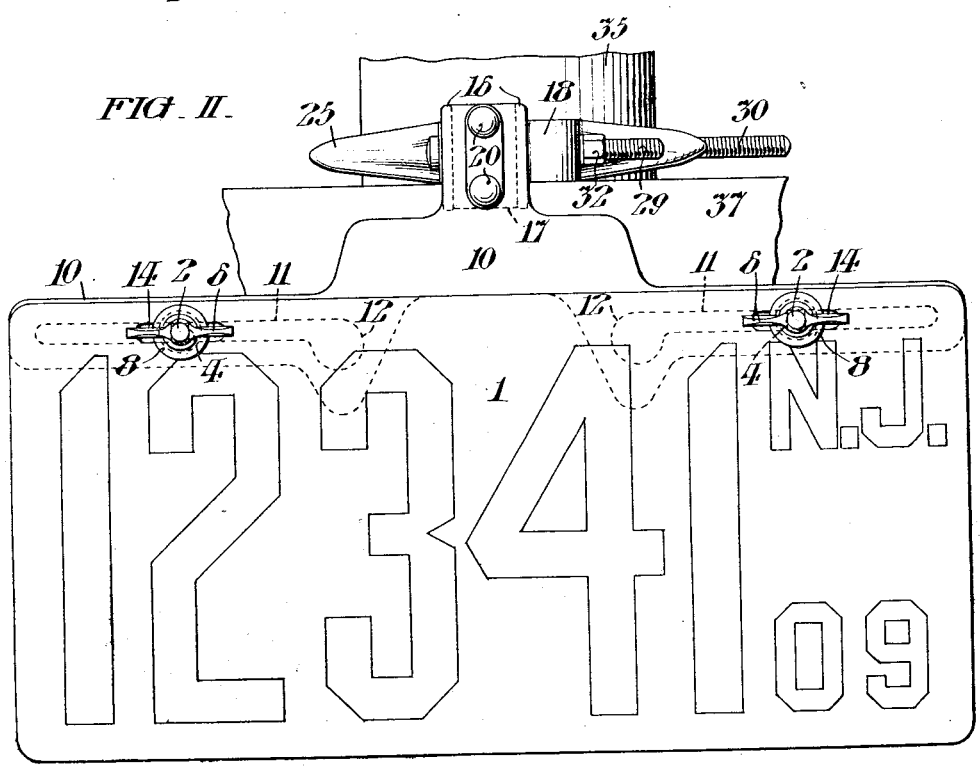
WITNESSES:
Philip W. Vessey
Joseph E. Segal
INVENTOR:
Edwin M. Rosenbluth
by Arthur E. Paige
Attorney

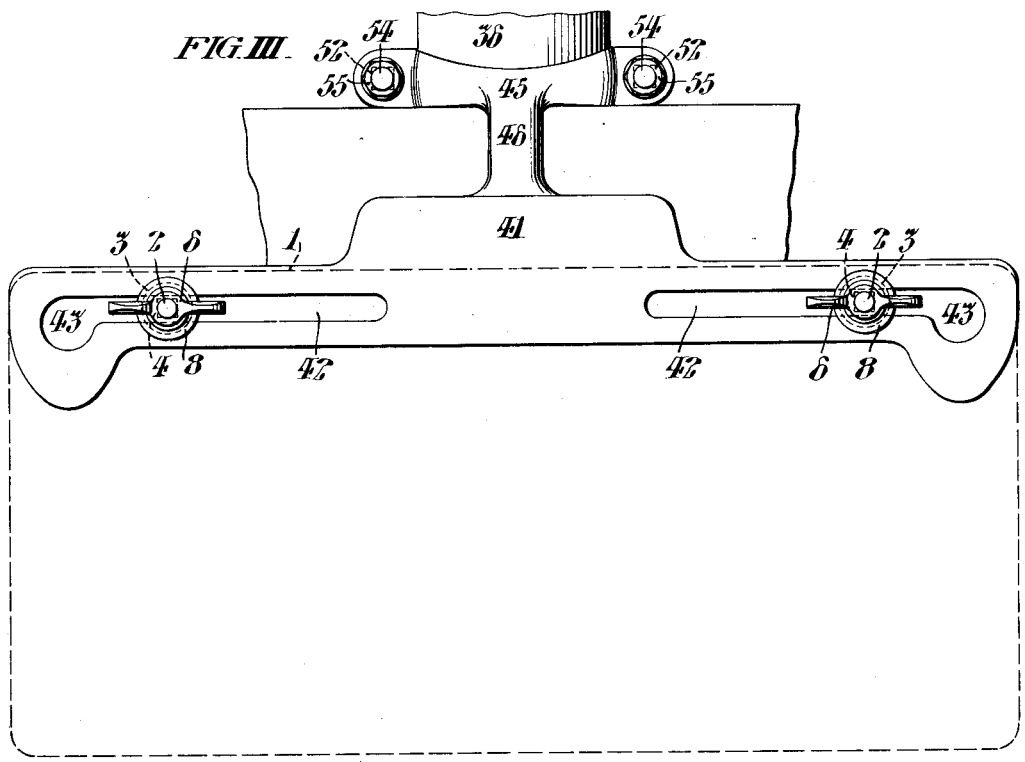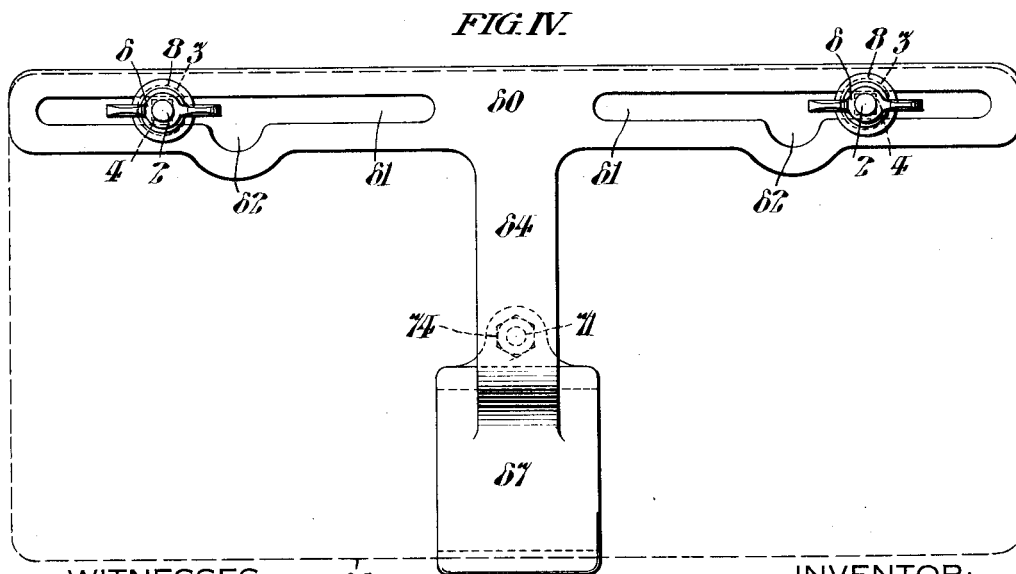

UNITED STATES PATENT OFFICE.

EDWIN M. ROSENBLUTH, OF PHILADELPHIA, PENNSYLVANIA.

VEHICLE-NUMBER-PLATE SUPPORT.

1,181,960. Specification of Letters Patent. Patented May 2, 1916.

Application filed June 25, 1913. Serial No. 775,653.

*To all whom it may concern:*

Be it known that I, EDWIN M. ROSENBLUTH, a citizen of the United States, residing at Philadelphia, in the State of Pennsylvania, have invented a certain new and useful Improvement in Vehicle-Number-Plate Supports, whereof the following is a specification, reference being had to the accompanying drawings.

My invention relates to means adapted to carry together and successively display, upon a single support on a vehicle, a plurality of license number plates; for instance, plates issued by adjoining States or municipalities and required to be respectively displayed when the vehicle passes within the jurisdiction thereof.

As hereinafter described, my invention includes means for holding two different license number plates together, back to back, so as to present their respective numbers upon opposite sides thereof, including bolts, carried by and common to both plates, said bolts having heads in spaced relation with said plates, and clamping means, in combination with a single support, stationary on the vehicle, including a slot or slots of such width as to properly engage said bolts carried by the license number plates, but said slots having enlargements through which the heads of the bolts may be withdrawn without disengaging them from said plates; said enlargements being so located with respect to the length of the slots that the bolt heads may not accidentally be presented in registry therewith to escape therefrom.

My invention includes the various novel features of construction and arrangement hereinafter more definitely specified.

In the drawings: Figure I is a plan view showing a support conveniently embodying my invention in connection with an elliptical inlet tube of an automobile radiator; the connecting means being adjustable longitudinally with respect to the support. Fig. II is a front view of said support shown in Fig. 1. Fig. III is a front view of a modified form of support wherein the enlargements, to permit the passage of the bolt heads, are at the outer ends of the slots. Fig. IV is a front view of a modified form of support wherein the enlargements, to permit the passage of the bolt heads, are intermediate of the length of the slots.

Referring to the form of my invention shown in Figs. I and II; 1 are vehicle license number plates carrying, in spaced relation, two bolts 2 having heads 3 larger than their shanks 4, (which are conveniently squared as indicated in dotted lines in Fig. II,) and having clamping means including the wing nuts 6, spiral spring washers 7 and plane washers 8. Said heads 3 are in spaced relation with said plate 1 so as to extend through the horizontal bar 10 in the slots 11 which extend horizontally, in alinement, in said bar and have enlargements 12 at their adjoining ends to permit said heads 3 to be passed freely therethrough. Although said plate 1 is provided with slots 14 through which said plate bolts 2 extend, (the form of said plates and the slots therein being beyond the control of the licensee, being predetermined by the authority issuing them;) said bolts 2 are thereby limited to such spaced relation that their heads 3 cannot be simultaneously presented in registry with said enlargements 12 in the horizontal bar 10; said enlargements being so located with respect to the length of the slots 11 that said bolt heads 3 may not accidentally be presented in registry therewith to escape therefrom. Therefore, it is necessary to shift said plate 1 with respect to said supporting bar 10 after passing one plate bolt head 3 through one enlargement, to bring the other plate bolt head in registry with the other enlargement in order to attach and detach said plate 1 with respect to said support. It is to be understood that said plate 1 is secured in attached position by the clamping means including said wing nuts 6, etc. Said horizontal bar 10 is provided with a vertical jaw seat including the parallel ribs 16 to receive the flange 17 of the jaw 18 which is rigidly connected with said bar 10 by the rivets 20; said jaw 18 being thus permanently eccentrically connected at one end to said bar 10 as shown in Fig. I. Said jaw 18 has the V-shaped recess 22 and the bolt holes 23 and 24 extending through said jaw upon respectively opposite sides of said recess parallel with the length of said bar 10. Said jaw 18 is opposed by the jaw 25 which is separate from said bar 10 and has the V-shaped recess 26 opposite the recess 22 in said jaw 18 with bolt holes 27 and 28 upon respectively opposite sides of said recess 26 in axial alinement with said bolt holes 23 and 24. It may be observed that said bolt holes 27 and 28 are square so as to prevent the rotation of the jaw bolts 29 and 30 which are carried by said jaw 25 extending therethrough. As shown in Fig. I the jaw bolt 29 adjoining said bar 10 is shorter than the jaw bolt 30 remote from said bar, and they are respectively provided with nuts 32 and 33; whereby said jaws 18 and 25 are relatively adjustable in the direction of the length of said bar 10 and unequally at their opposite ends, and adapted to detachably engage elliptical elements 35 or circular elements 36 of different dimensions between said jaws and in variable eccentric relation with respect to said bar 10. It is to be understood that said elements 35 and 36 are water inlet tubes upon automobile radiators 37 and 38 to which the vehicle number plate supports are thus rigidly secured. Said two vehicle license number plates 1 shown in Fig. I being held together, back to back, by said plate bolts 2 and the fittings thereof, which they carry, either license number may be manifested by reversing said plates in connection with the single support on the automobile above described. For instance, the license number plate displayed in Fig. II is one issued by the State of New Jersey, and the other may be a license plate issued by the State of Pennsylvania, and the latter may be displayed by merely loosening said wing nuts 6 so as to permit both plates to be removed with said plate bolts and fittings, and then replacing both plates in reversed position by passing the bolt heads 3 successively through said slot enlargements 12 from the opposite side of said bar 10 and again securing both plates to said bar by tightening said nuts 6, then upon the opposite side of said bar 10 to that upon which they appear in Figs. I and II.

The opposed jaw construction above described for securing the license number plate support upon the vehicle being somewhat complex to adapt it for engagement with elliptical elements such as 35 shown in Fig. I, and of different sizes, it is preferable to make the jaw 18 primarily separate from the bar 10 as a matter of convenience in manufacture. However, a vehicle number plate support having the feature of interchangeability but of much simpler construction may be made with one of the clamping jaws in unitary relation with the plate supporting bar, for instance, as shown in Fig. III, wherein the horizontal bar 41 having slots 42 extending horizontally, in alinement, with enlargement 43 at their outer ends to receive the plate bolts as above described, is in unitary relation with the jaw 45 with which it is connected by the curved arm 46. Said jaw 45 has the V-shaped recess 47 and the bolt holes 48 upon respectively opposite sides of said recess extending at right angles to the length of said bar 41. Said jaw 45 is opposed by the separate jaw 50 which has the V-shaped recess 51 opposite said recess 47 in the jaw 45, with bolt holes 52 upon respectively opposite sides of said recess 51 in axial alinement with said bolt holes 48; said holes 52 being square to prevent rotation of the jaw bolts 54 which are carried by said jaw 50 and provided with nuts 55, whereby said jaws 45 and 50 are relatively adjustable in a direction at right angles to the length of said bar 41 and adapted to detachably engage circular elements 36, of different dimensions, between them. Of course, it is to be understood that supports constructed in accordance with my invention may be used to hold single plates 1 instead of two plates back to back, and therefore I have shown but a single license number plate in Fig. III.

Both of the forms of my invention above described are adapted for connection with the water inlet, or so called "filler", tubes of automobile radiators. However, a vehicle number plate support having the feature of interchangeability above contemplated may be made with modified clamping means adapted to engage other portions of the vehicle. For instance, as shown in Fig. IV the horizontal bar 60 has slots 61 extending horizontally, in alinement, with enlargements 62 at their middles adapted for cooperation with the bolts 2 and fittings as above described. Said bar 60 has a central downwardly extending arm 64 against which the license number plate 65 is held by said bolts 2. Said arm 64 is in unitary relation with said bar 60, and has at its lower end the clamping jaw 67 having the rectangular recess 68 fitted to the vehicle axle, and having upon opposite sides of said recess 68 bolt holes extending at right angles to the plane of said bar 60 to receive the bolts 71 which are carried by the separate jaw 72 having the recess 73 complementary to said recess 68 and fitted to said axle. Said bolts 71 have nuts 74 whereby said jaws are relatively adjustable at right angles to the plane of said bar 60 to rigidly secure the latter in connection with said axle.

It is necessary to provide the support last described with the arm 64, or the equivalent thereof, to hold the bar 60 a sufficient distance above the axle to comply with the requirement of the laws of certain States for the maintenance of the vehicle license number plates a certain distance above the ground. However, a vehicle number plate support having the feature of interchangeability, above contemplated, but without the extension arm 64, may be made to fit horizontal members of a vehicle. Therefore, I do not desire to limit myself to the precise details of construction and arrangement herein set forth, as it is obvious that various modifications may be made therein without departing from the essential features of my invention as defined in the appended claims.

I claim:—

1. The combination with a vehicle license number plate carrying, in spaced relation, two axially adjustable bolts having heads larger than their shanks; of nuts for said bolts; a support having two slots, narrower than said heads, adapted to receive the shanks of said bolts, each having an enlargement of such size as to permit the passage of one of said heads through said support, said enlargements being so spaced that said heads cannot be simultaneously in registry therewith; whereby said plate may be secured to and removed from said support, by successively passing said heads through the respective enlargements, the plate being shifted with respect to said support after passing one head through one enlargement, to bring the other head in registry with the other enlargement.

2. A vehicle number plate support including a plane bar having two slots with enlargements; number plate attaching means including elements fitting in said slots and having heads wider than said slots but of such size that they may be readily withdrawn through said enlargements when in registry therewith; and, means maintaining said elements so spaced that said heads cannot be simultaneously in registry with said enlargements.

3. A vehicle number plate support including a bar having two slots extending inwardly from opposite ends thereof with enlargements at their inner ends; number plate attaching means including elements fitting in said slots and having heads wider than said slots but of such size that they may be readily withdrawn through said enlargements when in registry therewith; and means maintaining said elements so spaced that said heads cannot be simultaneously in registry with said enlargements.

4. A vehicle number plate support including a bar having two slots extending inwardly from opposite ends thereof, with enlargements at their inner ends; and number plate attaching means including elements fitting in said slots, and having heads wider than said slots but of such size that they may be readily withdrawn through said enlargements when in registry therewith.

In testimony whereof, I have hereunto signed my name at Philadelphia, Pennsylvania, this twenty-first day of June, 1913.

EDWIN M. ROSENBLUTH.

Witnesses:
   G. W. K. VOIGT,
   E. G. McCULLOUGH.